United States Patent
Horling et al.

(10) Patent No.: US 9,253,302 B2
(45) Date of Patent: Feb. 2, 2016

(54) POPULATING USER CONTACT ENTRIES

(71) Applicant: Google Inc., Mountain View, CA (US)

(72) Inventors: Bryan Christopher Horling, Sunnyvale, CA (US); Okan Kolak, Sunnyvale, CA (US); Rosa Wu, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/296,327

(22) Filed: Jun. 4, 2014

(65) Prior Publication Data
US 2015/0358447 A1    Dec. 10, 2015

(51) Int. Cl.
| | |
|---|---|
| *H04M 1/725* | (2006.01) |
| *H04M 1/2745* | (2006.01) |
| *G06K 9/00* | (2006.01) |
| *H04W 4/02* | (2009.01) |
| *H04W 4/08* | (2009.01) |
| *H04W 4/14* | (2009.01) |
| *H04W 4/12* | (2009.01) |

(52) U.S. Cl.
CPC .. *H04M 1/274516* (2013.01); *H04M 1/274533* (2013.01); *G06K 9/00469* (2013.01); *H04W 4/02* (2013.01); *H04W 4/08* (2013.01); *H04W 4/12* (2013.01); *H04W 4/14* (2013.01)

(58) Field of Classification Search
CPC ......... H04W 4/003; H04W 4/06; H04W 4/08; H04W 4/18; H04W 76/00; H04W 76/002; H04W 76/02; H04W 76/04; H04W 76/042; H04W 88/02; H04W 88/1842; G06Q 50/01; G06Q 30/02; G06Q 30/0251; G06Q 30/0255; G06Q 30/0277; G06Q 10/00
USPC ........ 455/403, 414.1, 432.3, 412.1, 433, 459, 455/566, 415, 466
See application file for complete search history.

(56) References Cited

U.S. PATENT DOCUMENTS

| | | |
|---|---|---|
| 7,051,049 B2 | 5/2006 | Samn |
| 7,739,246 B2 | 6/2010 | Mooney et al. |
| 2003/0078981 A1 | 4/2003 | Harms et al. |
| 2005/0204007 A1 | 9/2005 | McGregor et al. |
| 2010/0070488 A1 | 3/2010 | Sylvain |
| 2010/0198854 A1 | 8/2010 | Chitturi et al. |
| 2012/0089644 A1 | 4/2012 | Doggett et al. |
| 2012/0158751 A1 | 6/2012 | Tseng |
| 2013/0103688 A1 | 4/2013 | Tien et al. |
| 2013/0282812 A1* | 10/2013 | Lessin et al. .................. 709/204 |
| 2013/0289939 A1 | 10/2013 | Brdiczka |

(Continued)

OTHER PUBLICATIONS

Culotta, Aron, et al. "Extracting social networks and contact information from email and the web." (2004); 9 pages.
International Search Report and Written Opinion of PCT Serial No. PCT/US15/033542 Aug. 10, 2015.

*Primary Examiner* — Jean Gelin
(74) *Attorney, Agent, or Firm* — Middleton Reutlinger

(57) ABSTRACT

Methods and apparatus for populating a contact entry of a user based on information obtained from one or more sources that are external to the contact entry. Some implementations are directed generally to analyzing text of a document associated with the user to identify contact information in the document. In some versions of those implementations, an affinity measure associated with the document may be determined that is indicative of an amount of interest of the user in the document and a contact entry may be populated with one or more aspects of the contact information based on the affinity measure satisfying a threshold.

25 Claims, 7 Drawing Sheets

(56) References Cited

U.S. PATENT DOCUMENTS

| | | | |
|---|---|---|---|
| 2014/0005501 A1* | 1/2014 | Schabbach et al. | 600/301 |
| 2014/0081914 A1 | 3/2014 | Smith et al. | |
| 2014/0229460 A1* | 8/2014 | Cohen et al. | 707/706 |
| 2014/0282016 A1* | 9/2014 | Hosier, Jr. | 715/733 |
| 2014/0317184 A1* | 10/2014 | Weaver et al. | 709/204 |
| 2014/0379483 A1* | 12/2014 | Iannaccone et al. | 705/14.66 |
| 2015/0026162 A1* | 1/2015 | King et al. | 707/722 |
| 2015/0058751 A1* | 2/2015 | Tseng | 715/753 |

* cited by examiner

FIG. 2A — Table 107:

| | Alias(es) | Phone(s) | Email(s) | Address(es) |
|---|---|---|---|---|
| 107A | Robert Herman | C: (123)456-7891 | robert@!.com | 123 Main St. |
| 107B | Joseph M. | C: (234)567-8912 | joe@!.com<br>joem@!.com | |
| ... | | | | |
| 107C | | (456)789-1234 | | |

FIG. 2B — Table 107:

| | Alias(es) | Phone(s) | Email(s) | Address(es) |
|---|---|---|---|---|
| 107A | Robert Herman; Bobby | C: (123)456-7891 | robert@!.com | 123 Main St. |
| 107B | Joseph M. | C: (234)567-8912 | joe@!.com<br>joem@!.com | W: 456 Main St. |
| ... | | | | |
| 107C | Dentist; My Dentist; Dr. Bill | W: (456)789-1234 | drbill@!.com | 100 Broadway Suite A |
| 107D | Realtor; My Realtor; Susan Sells | W: (198)765-4321 | sue@!.com | 200 Broadway Suite C |

POPULATING USER CONTACT ENTRIES

BACKGROUND

A user may be associated with one or more contact collections, each including one or more contact entries. For example, a user may have a contact collection on a mobile phone that includes contact entries each including one or more properties of an entity such as a name, phone number, and/or email address of the entity. Also, for example, the user may have a contact collection associated with an email service that includes contact entries each including one or more properties of an entity. A user may find it burdensome to maintain complete information and/or to update information in one or more of the contact collections.

SUMMARY

This specification is directed generally to populating contact entries of users, and, more particularly, to populating a contact entry of a user based on information obtained from one or more sources that are external to the contact entry. Some implementations are directed generally to analyzing text of a document associated with the user to identify contact information in the document. In some versions of those implementations, an affinity measure associated with the document may be determined that is indicative of an amount of interest of the user in the document and a contact entry may be populated with one or more aspects of the contact information if the affinity measure satisfies a threshold. For example, the text of the document may be analyzed to identify a contact information change in the document and the affinity measure may be based at least in part on identification of the contact information change. Also, for example, the affinity measure may additionally and/or alternatively be based on interaction(s) of the user related to the document such as quantity of interactions of the user with the document, quantity of interactions of the user with an entity associated with the document, and/or a length of interaction(s) with the document and/or the entity associated with the document. In some implementations of analyzing text of a document associated with the user to identify contact information, an introductory clause of the document is analyzed to identify an alias of the contact information.

In some implementations, a computer implemented method may be provided that includes the steps of: identifying a document associated with a user, the document visited, sent, or received by the user; analyzing text of the document to identify contact information in the document; determining an affinity measure associated with the document, the affinity measure indicative of an interest of the user in the document; and populating, based on the affinity measure satisfying a threshold, a contact entry of the user with one or more aspects of the contact information.

This method and other implementations of technology disclosed herein may each optionally include one or more of the following features.

In some implementations, the document is received by the user from an entity, and the method further includes: identifying a measure indicative of a quantity of interactions of the user with the entity, wherein determining the affinity measure for the document is based on the measure indicative of the quantity of interactions.

In some implementations, the method further includes: analyzing the document to identify a contact information change measure associated with the document, the contact information change measure indicative of likelihood of a recent change to the contact information, wherein determining the affinity measure for the document is based on the contact information change measure. In some of those implementations, populating the contact entry of the user with one or more aspects of the contact information includes supplanting existing information of the contact entry with the one or more aspects of the contact information. In some of those implementations, analyzing the document to identify a contact information change measure includes: determining the contact information change measure based at least in part on presence of one or more contact information change terms in the text of the document. In some of those implementations, the document is received by the user from an entity and the method further includes: identifying a quantity of recipients of the document, wherein determining the contact information change measure is based at least in part on the quantity of recipients of the document. In some of those implementations, determining the contact information change measure is based at least in part on proximity of the one or more contact information change terms to the contact information in the document. In some of those implementations, determining the contact information change measure is based at least in part on a position of the contact information in the document.

In some implementations, the document is sent by the user to an entity and analyzing text of the document to identify contact information in the document includes: analyzing the text to identify an introductory clause of the document; identifying an alias of the contact information based on one or more terms of the introductory clause; and using the alias as at least some of the one or more aspects of the contact information.

In some implementations, populating the contact entry of the user with one or more aspects of the contact information includes: identifying the contact entry from a plurality of existing contact entries associated with the user; and supplementing or supplanting information of the contact entry with the one or more aspects of the contact information. In some of those implementations, identifying the contact entry from a plurality of existing contact entries associated with the user includes: identifying an association between one or more aspects of the contact information and at least some preexisting information of the contact entry.

In some implementations, populating the contact entry of the user with one or more aspects of the contact information includes: identifying a lack of association between the contact information and existing contact entries associated with the user; and creating the contact entry based on the identified lack of association.

In some implementations, a computer implemented method may be provided that includes the steps of: identifying a contact entry of one or more contact collections associated with a user, the contact entry including associated information identifying a set of one or more properties of an entity; determining the associated information fails to identify at least one property of the entity; determining, from a source that is external to the contact collections associated with the user, additional information to identify the at least one property of the entity, wherein determining the additional information from the source includes identifying, in the source, an association between the additional information and at least some of the associated information; and modifying the contact entry to include the additional information.

This method and other implementations of technology disclosed herein may each optionally include one or more of the following features.

In some implementations, determining the association between the additional information and at least some of the associated information includes: identifying the entity in the source based on an association between the entity and at least some of the associated information; and identifying an association between the entity and the additional information in the source. In some of those implementations, the source is a structured collection of information defining, for each of a plurality of entities, attributes of the entity, and wherein the association between the entity and at least some of the associated information is based on matching at least some of the associated information to one or more of the attributes of the entity.

In some implementations, determining the association between the additional information and at least some of the associated information includes: identifying an association between at least some of the associated information of the contact entry and a document associated with the user; and identifying the additional information based on the document. In some of those implementations, the document is a message sent or received by the user and wherein identifying the association between at least some of the associated information of the contact entry and the document includes identifying at least some of the associated information in the message.

Other implementations may include a non-transitory computer readable storage medium storing instructions executable by a processor to perform a method such as one or more of the methods described above. Yet another implementation may include a system including memory and one or more processors operable to execute instructions, stored in the memory, to perform a method such as one or more of the methods described above.

Particular implementations of the subject matter described herein alter one or more contact collections associated with a user by populating one or more contact entries of the contact collection with contact information obtained via one or more techniques described herein. It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 2A illustrates an example of contact entries of a contact collection of a user.

FIG. 2B illustrates an example of the contact entries of FIG. 2A populated with additional information obtained from one or more sources that are external to the contact entries.

DETAILED DESCRIPTION

Figure 1:
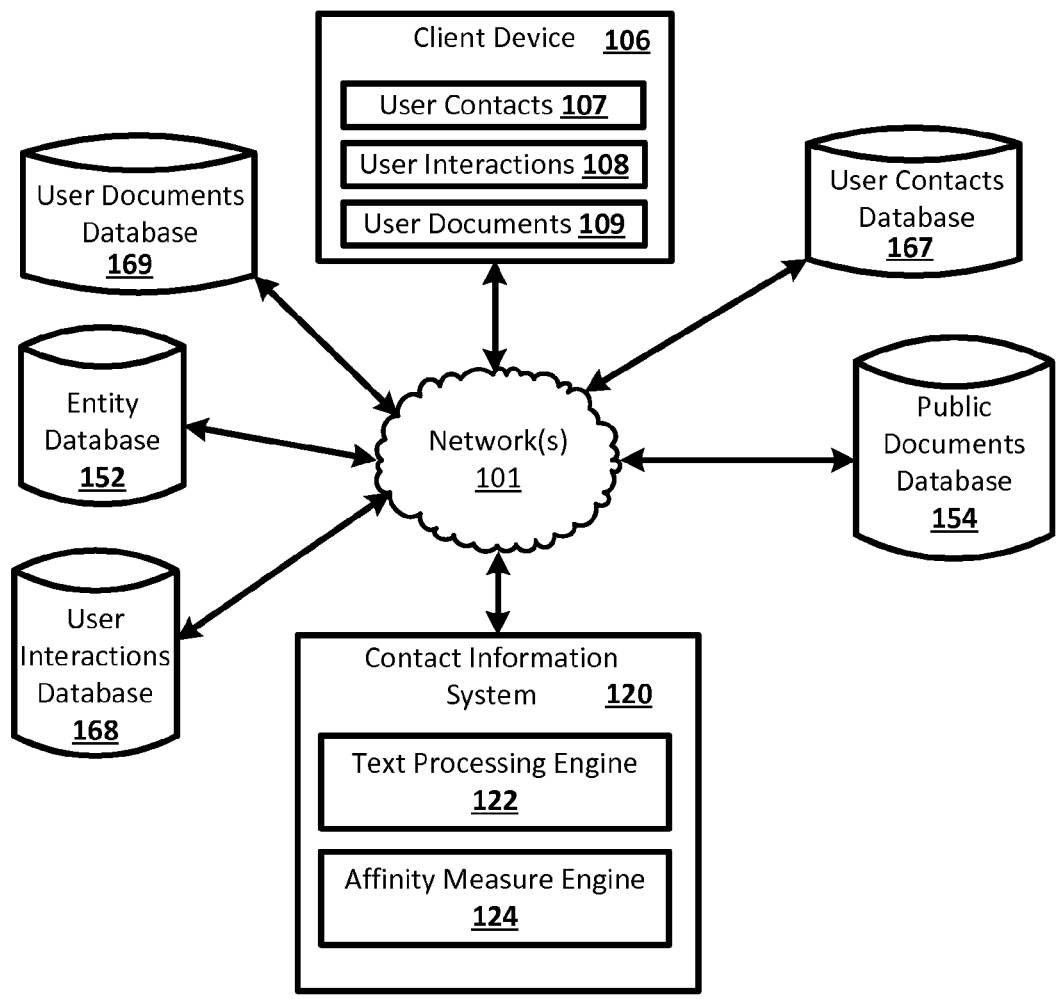
FIG. 1 illustrates an example environment in which a contact entry of a user may be populated based on information obtained from one or more sources that are external to the contact entry.

FIG. 1 illustrates an example environment in which a contact entry of a user may be populated based on information obtained from one or more sources that are external to the contact entry. The example environment includes a client device 106 and a contact information system 120. The client device 106 includes user contacts 107, user interactions 108, and user documents 109. The example environment also includes an entity database 152, a public documents database 154, a user contacts database 167, a user interactions database 168, and a user documents database 169.

Generally, each of user contacts 107 and user contacts database 167 may include one or more contact collections of a user, with each of the contact collections including one or more contact entries. A contact entry includes information identifying a set of one or more properties of an entity. For example, a contact entry for an individual may include one or more aliases, phone numbers, email addresses, addresses, occupations, uniform resource locators (URLs), descriptive notes, images, and/or other properties associated with the individual. In some implementations, user contacts 107 stored locally on the client device 106 and user contacts database 167 may include one or more of the same contact entries and/or may contain one or more different contact entries. For example, the user contacts 107 may be synched to the user contacts database 167 on a periodic or other basis. In some implementations, one or more of user contacts 107 and/or user contacts database 167 may be omitted and/or not utilized in techniques described herein.

Generally, each of user documents 109 and user documents database 169 may include one or more non-publicly accessible documents that are associated with a user. A non-publicly accessible document associated with a user may include, for example, a document created by the user, a document sent to or otherwise accessible to the user, and/or a document sent by or otherwise provided by the user. As used herein, documents include, but are not limited to: emails, text messages (e.g., SMS text messages), social networking communications (e.g., chats, private messages, public messages, posts, tweets), webpages, and word processing documents. For example, a non-publicly accessible document associated with a user may be an email of the user (sent or received), a text message of the user (sent or received), a social networking communication (sent or received), a social networking profile accessible by the user, a document created by the user, etc. In some implementations, user documents 109 stored locally on the client device 106 and user documents database 169 may include one or more of the same documents and/or may contain one or more different documents. For example, the user documents database 169 may include social networking profiles, emails, social networking communications, and/or other messages associated with the user and user documents 109 may include one or more documents not included in user documents database 169 such as text messages of the user. In some implementations, one or more of user documents 109 and/or user documents database 169 may be omitted and/or not utilized in techniques described herein.

Generally, each of user interactions 108 and user interactions database 168 may identify one or more interactions of a user with documents and/or entities. An interaction of a user with a document may be, for example, a selection of a link to the document (e.g., selecting a search result for the document), a viewing of the document, and/or sending or receiving the document (e.g., sending or receiving an email). An interaction of a user with an entity may be, for example, an interaction with a document associated with the entity, a communication with the entity (e.g., a call, email, text message, social networking communication), and/or information indicating presence at/with the entity (e.g., location information indicating presence at a business or co-presence information indicating co-presence with an individual). In some implementations, indicated interactions of a user with a document may include, for each document or entity indicated as interacted with, additional details about the interaction such as an indication of the time, date, or location of the interaction, a quantity of interactions, identification of properties of the computing device utilized in the interaction, etc.

In some implementations, user interactions 108 stored locally on the client device 106 and user interactions database 168 may include one or more of the same interactions and/or may contain one or more different interactions. For example, the user interactions database 168 may include interactions indicating selection of documents in response to search queries of the user and/or interactions indicating sending and/or receiving emails and the user interactions 108 may include one or more interactions not included in user interactions database 168 such as interactions indicating sending and/or receiving text messages and/or indicating placing and/or receiving phone calls. In some implementations, one or more of user interactions 108 and/or user interactions database 168 may be omitted and/or not utilized in techniques described herein. For example, in some implementations, one or more documents of user documents 109 and/or user documents database 169 may include information indicating interaction(s) of the user with the document and user interactions 108 and user interactions database 168 may be omitted.

In some implementations, one or more of user contacts database 167, user interactions database 168, and/or user documents database 169 may include information items of a plurality of users and access to information items of a user in database 167, 168, and/or 169 may be allowed for only the user and/or one or more other users or components authorized by the user such as contact information system 120. In some implementations, each user may have control over whether and/or which contacts, interactions, and/or documents are provided for inclusion in the respective database 167, 168, or 169. In some implementations, each user may have the ability to remove information items of the user included in user contacts database 167, user interactions database 168, and/or user documents database 169.

Generally, public documents database 154 may include one or more publicly accessible documents and/or information related to one or more publicly accessible documents. For example, the public documents database 154 may include a collection of databases accessible via the Internet and/or an index of documents accessible via the Internet. For example, documents included in the public documents database 154 may include webpages, PDFs, and/or structured sets of data, to name just a few. For instance, a webpage and/or structured set of data may include a yellow page and/or white page listing of contact information for a plurality of entities. In some implementations, one or more documents of the public documents database 154 may be associated with a user based on user interactions 108 and/or user interactions database 168. For example, user interactions 108 and/or user interactions database 168 may indicate the user interacted with a given document of the public documents database 154 and the given document may be associated with the user based on such indicated interaction.

Generally, entity database 152 may include a collection of entities and may include, for each of one or more of the entities, a mapping to one or more properties associated with the entity and/or one or more entities related to the entity. For example, the entity database 152 may be a knowledge graph, such as a local knowledge graph that includes entities associated with businesses and includes properties for each of the entities such as phone numbers, addresses, etc.

In this specification, the term "database" will be used broadly to refer to any collection of data. The data of the database does not need to be structured in any particular way, or structured at all, and it can be stored on storage devices in one or more locations. Thus, for example, the databases 167, 168, 169, 152, and/or 154 may each include multiple collections of data, each of which may be organized and accessed differently. Also, for example, all or portions of the databases 167, 168, 169, 152, and/or 154 may be combined into one database and/or may contain pointers and/or other links between entries in the database(s). Also, in this specification, the term "entry" will be used broadly to refer to any mapping of a plurality of associated information items. A single entry need not be present in a single storage device and may include pointers or other indications of information items that may be present on other storage devices. For example, an entry may include multiple nodes mapped to one another, with each node including an identifier of an entity or other information item that may be present in another data structure and/or another storage medium.

Generally, the contact information system 120 determines contact information from one or more sources such as databases 152, 154, 168, 169, user interactions 108, and/or user documents 109, and populates one or more contact entries of user contacts 107 and/or user contacts database 167 with one or more aspects of the determined contact information. The contact information system 120 can be implemented in one or more computers that communicate, for example, through a network. The contact information system 120 is an example of a system in which the systems, components, and techniques described herein may be implemented and/or with which systems, components, and techniques described herein may interface.

The contact information system 120 includes a text processing engine 122 that processes text to determine one or more features of the text such as features described herein. For example, the text processing engine 122 may process text to determine if the text includes contact information, to determine particular properties of any determined contact information (e.g., which aspects of the contact information is an alias, address, email address, phone number, etc.), to determine with which contact entry of a user (if any) any determined contact information is associated, and/or to determine if the text includes a contact information change. In some implementations, the text processing engine 122 may receive as input one or more signals associated with one or more segments of text and provide as output an indication of one or more features associated with the one or more segments. In some of those implementations, the text processing engine 122 may utilize classifier and/or rules based approaches to determine one or more features based on the one or more signals. For example, the text processing engine 122 may utilize one or more regular expressions to identify contact information and/or particular properties of the contact information. Also, for example, the text processing engine 122 may utilize a classifier trained to identify whether a contact information change is present in one or more segments of text. Any classifier utilized by the text processing engine 122 may be trained, for example, utilizing one or more supervised or semi-supervised training techniques.

The signals provided as input to the text processing engine 122 for one or more segments of text for a given document may include signals based on content of the segments themselves such as one or more terms of the segments, parts of speech associated with one or more terms of the segments, relationships between one or more terms of the segments and/or metadata associated with the segment. The signals provided as input to the text processing engine 122 for one or more segments of text for a given document may additionally and/or alternatively include signals based on content external to the segment itself such as metadata of the document, signals related to text outside of the segments, etc. For example, the signals may include signals based on neighboring and/or otherwise proximal segments, metadata of the document, etc.

In some implementations, the text processing engine 122 may include and/or be in communication with an annotator configured to identify and annotate various types of grammatical information in one or more segments of a document and the annotations may be utilized as signals by the text processing engine 122. For example, the annotator may include: a part of speech tagger configured to annotate terms in one or more segments with their grammatical roles; a dependency parser configured to determine syntactic relationships between terms in one or more segments; an entity tagger configured to annotate entity references in one or more segments such as references to people, organizations, locations, and so forth; and/or a coreference resolver configured to group, or "cluster," references to the same entity based on one or more contextual cues.

In some implementations, the contact information system 120 also includes an affinity measure engine 124 that determines an affinity measure associated with a document that is indicative of an amount of interest of the user in the document. As described herein, in some implementations the contact information system 120 may populate a contact entry of a user with one or more aspects of contact information identified in a document based on the affinity measure. For example, in some implementations the contact information system 120 may populate a contact entry of a user with one or more aspects of contact information identified in a document only when the affinity measure satisfies a threshold. In some implementations, an affinity measure be expressed as a numeric or alphabetical value along a range, e.g., from zero to one. In some implementations, an affinity measure may be expressed in a binary fashion, e.g., as positive (e.g., "true") or negative (e.g., "false").

The affinity measure engine 124 may utilize various signals in determining an affinity measure. For example, the affinity measure engine 124 may communicate with the text processing engine 122 to determine if a contact information change is present in the document and base the affinity measure on whether the contact information change is present. For instance, the affinity measure may be more indicative of interest of the user in the document if the contact information change is present. Also, for example, the affinity measure engine 124 may determine the affinity measure based on interaction(s) of the user related to the document identified, for example, via user interactions 108 and/or user interactions database 168. For example, the affinity measure engine 124 may determine the affinity measure based on a quantity of interactions of the user with the document (e.g., the more interactions the more indicative of interest the affinity measure is), quantity of interactions of the user with an entity associated with the document (e.g., the more interactions the more indicative of interest the affinity measure is), and/or a length of interaction(s) with the document and/or the entity associated with the document (e.g., the longer the interactions the more indicative of interest the affinity measure is). Additional description of the contact information system 120, including the engines 122 and 124, is provided below.

The client device 106 may be a computer coupled to the contact information system 120 and/or one or more databases, such as user contacts database 167, through one or more networks 101 such as a local area network (LAN) or wide area network (WAN) (e.g., the Internet). The client device 106 may be, for example, a desktop computing device, a laptop computing device, a tablet computing device, a mobile phone computing device, a computing device of a vehicle of the user (e.g., an in-vehicle communications system, an in-vehicle entertainment system, an in-vehicle navigation system), or a wearable apparatus of the user that includes a computing device (e.g., a watch of the user having a computing device, glasses of the user having a computing device). Additional and/or alternative client devices may be provided. While the user likely will operate a plurality of client devices, for the sake of brevity, examples described in this disclosure will focus on the user operating client device 106. However, it is understood that user contacts, interactions, documents, and/or other information associated with a user may be based on additional and/or alternative client devices of the user.

Figure 12:
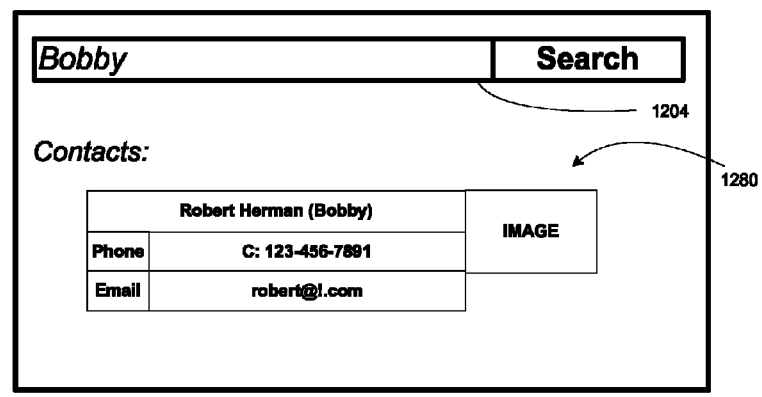
FIG. 12 illustrates an example of a user interface for displaying information from a contact entry.

The client device 106 typically includes one or more applications to facilitate, for example, interaction with documents, viewing of information from a contact entry, editing contact entries, etc. For example, the client device 106 may execute one or more applications, such as a browser, a contacts management and/or search system, and/or other application that displays and/or otherwise provides (e.g., audible output) information from a contact entry of user contacts 107 and/or user contacts database 167. One example user interface for displaying information from a contact entry is illustrated in FIG. 12 and described in more detail herein. In some implementations, one or more aspects of the contact information system 120, such as the affinity measure engine 124, may be implemented in a component that is executed in whole or in part by client device 106.

Figure 13:
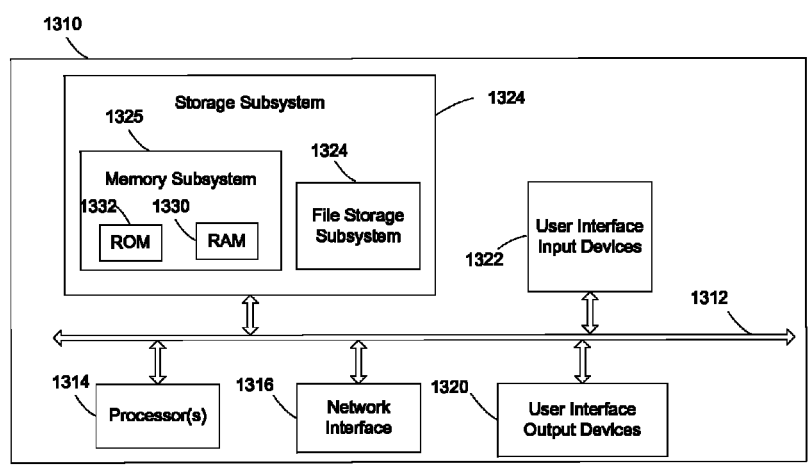
FIG. 13 illustrates an example architecture of a computer system.

The contact information system 120, the client device 106, and/or one or more additional components of the example environment of FIG. 1 may each include memory for storage of data and software applications, a processor for accessing data and executing applications, and components that facilitate communication over a network. In some implementations, such components may include hardware that shares one or more characteristics with the example computer system that is illustrated in FIG. 13. The operations performed by one or more components of the example environment may optionally be distributed across multiple computer systems. For example, the steps performed by the contact information system 120 may be performed via one or more computer programs running on one or more servers in one or more locations that are coupled to each other through a network. Many other configurations are possible having more or fewer components than the environment shown in FIG. 1. For example, in some environments all or aspects of the contact information system 120 may be incorporated in the client device 106. Also, for example, in some implementations one or more of the databases 167, 168, 169, 152, and/or 154 may be omitted and/or combined.

FIG. 2A illustrates an example of contact entries 107A, 107B, and 107C of user contacts 107. Although three contact entries are illustrated in FIG. 2A, the ellipsis between contact entry 107B and contact entry 107C is provided to indicate that additional contact entries may be included. Each of the contact entries 107A, 107B, and 107C include associated information for one or more of alias(es), phone(s), email(s), and address(es) properties. For example, contact entry 107A includes associated information for each of the aforementioned properties, whereas contact entry 107C includes associated information for only the phone(s) property. Although four particular properties are illustrated in FIG. 2A, additional and/or alternative properties may be provided. For example, the ellipses to the right of the contact entries are provided to indicate that additional properties may be included. As described, in some implementations the contact entries 107A, 107B, and 107C may additionally and/or alternatively be stored in user contacts database 167.

FIG. 2B illustrates an example of the contact entries of FIG. 2A populated with additional information obtained from one or more sources that are external to the contact entries 107A-C. For example, in FIG. 2B the contact entry 107A is populated with an additional alias for the contact entry 107A. FIG. 2B also includes an additional contact entry 107D that may be created based on information obtained from one or more sources that are external to the contact entries 107A-C. The contact information system 120 determines the contact information for populating the contact entries 107A, 107B, 107C, and 107D from one or more sources such as databases 152, 154, 168, 169, user interactions 108, and/or user documents 109.

With reference to FIGS. 3-6, examples are described of the contact information system 120 determining the contact information for populating the contact entries 107A, 107B, 107C, and 107D with the additional contact information illustrated in FIG. 2B (and not illustrated in FIG. 2A). While certain techniques and sources are described with respect to FIGS. 3-6, additional and/or alternative techniques may be utilized by the contact information system 120 to populate one or more of the contact entries 107A, 107B, 107C, and 107D, such as combinations of the described techniques.

Figure 3:
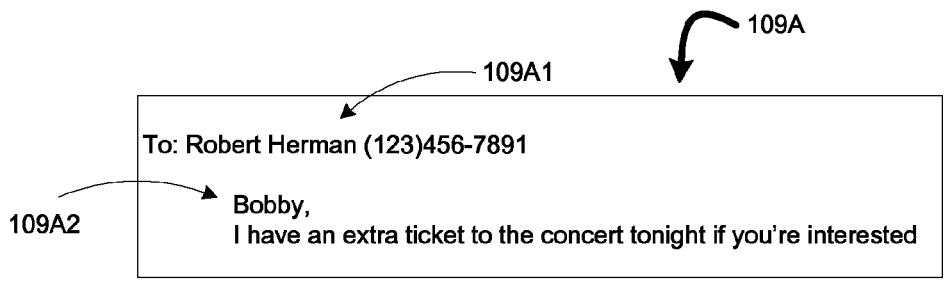
FIG. 3 illustrates an example of a sent message of a user that may be utilized to determine information for populating a contact entry of the user.

FIG. 3 illustrates an example of a sent message 109A of a user that may be utilized to determine information for populating the contact entry 107A of FIGS. 2A and 2B. Message 109A is an example of a text message that may be included in user documents 109. In some implementations, one or more aspects of message 109A may be provided by client device 106, directly or indirectly, to the contact information system 120. The contact information system 120 may identify a phone number to which the message was sent ((123-456-7891)) and/or an alias to which the message was sent (Robert Herman) to enable determination of one or more contact entries associated with the message. For example, the contact information system 120 may identify the phone number and/or alias based on structured information associated with the message 109A (e.g., based on structured metadata of the message 109A that identifies phone number(s) and/or aliases to which the message 109A is sent). Also, for example, the text processing engine 122 may process text segment 109A1 and/or other textual segments to determine the text segment 109A1 includes a phone number and an alias to which the message is addressed. For example, the text processing engine 122 may identify the phone number and/or alias using known text patterns, regular expressions, and so forth. For example, text processing engine 122 may include a rule to identify phone numbers and/or aliases that follow "To:" in a message and determine such phone numbers and/or aliases indicate to whom the message is directed.

The determined phone number and/or alias may be matched to the associated information in contact entry 107A of FIG. 2A. For example, the contact information system 120 may match the alias "Robert Herman" to the associated information for the alias property of contact entry 107A and match the phone number "(123)456-7891" to the associated information for the phone(s) property of contact entry 107A. Based on the matching, the contact information system 120 may determine the message 109A is associated with the contact entry 107A.

The contact information system 120 may further identify the alias "Bobby" utilized in the segment 109A2 in the body of the message 109A and populate the contact entry 107A with the alias "Bobby" as illustrated in FIG. 2B. For example, the text processing engine 122 may include a rule that identifies an introductory clause in the message 109A based on, for example, identifying one or more terms at the beginning of the body of the message that are followed by ","; ":" and/or a paragraph break. The contact information system 120 may utilize the introductory clause as an alias for a contact entry when, for example, the message 109A is sent to only a single entity and/or when the introductory clause is less than a certain number of terms (e.g., three terms) and/or does not include certain terms (e.g., "sir", "all", "whom it may concern"). For example, the contact information system 120 may populate "Bobby" as an alias for contact entry 107A based on determining the message 109A is sent to only a single entity (e.g., utilizing techniques such as those described above) and based on the text processing engine 122 identifying "Bobby" as a term utilized in an introductory clause of the message 109A.

In some implementations, the contact information system 120 may determine an affinity measure associated with the message 109A and populate the contact entry 107A with the alias based on the affinity measure. For example, in some implementations the alias may only be populated in the contact entry 107A when the affinity measure satisfies a threshold. As one example, the affinity measure may be based on an amount of time a user viewed the message 109A, a quantity of times the user viewed the message 109A, and/or a quantity of other interactions of the user with "Robert Herman" (e.g., quantity of other text messages and/or other interactions such as phone calls, emails, etc.).

Figure 4:
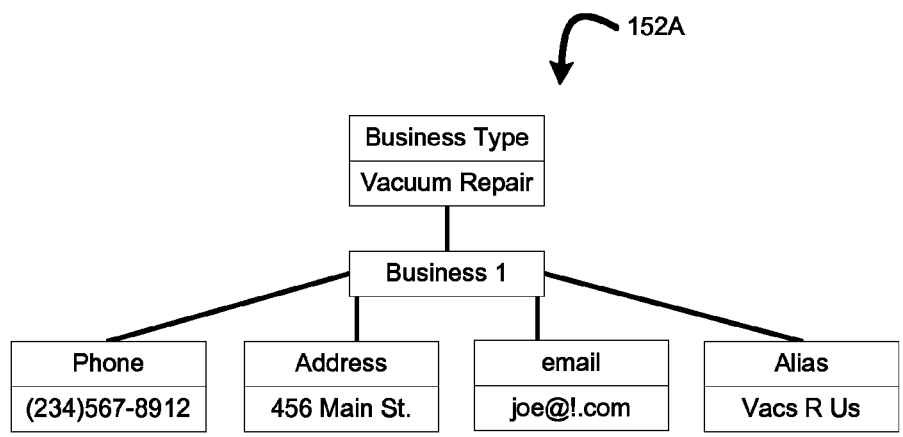
FIG. 4 illustrates an example of a portion of an entity database that may be utilized to determine information for populating a contact entry of the user.

FIG. 4 illustrates an example of a portion 152A of the entity database 152 of FIG. 1 that may be utilized to determine information for populating the contact entry 107B of FIG. 2A. The portion 152A includes an identifier for an entity "Business 1" and mappings to properties associated with the entity and a business type associated with the entity. For example, in FIG. 4 the entity "Business 1" is mapped (as indicated by lines from "Business 1") to phone, address, email and alias properties and to a business type associated with the entity ("Vacuum Repair").

The contact information system 120 may match the contact entry 107B to the "Business 1" entity of FIG. 4 based on matching associated information in contact entry 107B with properties of the "Business 1" entity in FIG. 4. For example, the contact information system 120 may match the phone number "(234)567-8912" and email address "joe@!.com" of the contact entry 107B to information in the "phone" and "email" properties of FIG. 4. The contact information system 120 may further identify one or more additional properties for the "Business 1" entity in portion 152A and populate the contact entry 107A with information for those properties. For example, as illustrated in FIG. 2B the contact information system 120 may populate the contact entry 107B with a work address of "456 Main St." based on that address being associated with the "Business 1" entity in the portion 152A of FIG. 4. Although not illustrated in FIG. 2B, additional and/or alternative information from the portion 152A may be populated in the contact entry 107B such as the alias "Vacs R US" and/or the business type of "Vacuum Repair." In some implementations, the contact information system 120 may determine an affinity measure associated with the "Business 1" entity and populate the contact entry 107B with the information from portion 152A based on the affinity measure. For example, in some implementations the alias may only be populated in the contact entry 107B when the affinity measure satisfies a threshold. As one example, the affinity measure may be based on a quantity of interactions of the user with "Business 1" such as visits to webpages associated with "Business 1", calls to the phone number associated with "Business 1", etc.

Figure 5:
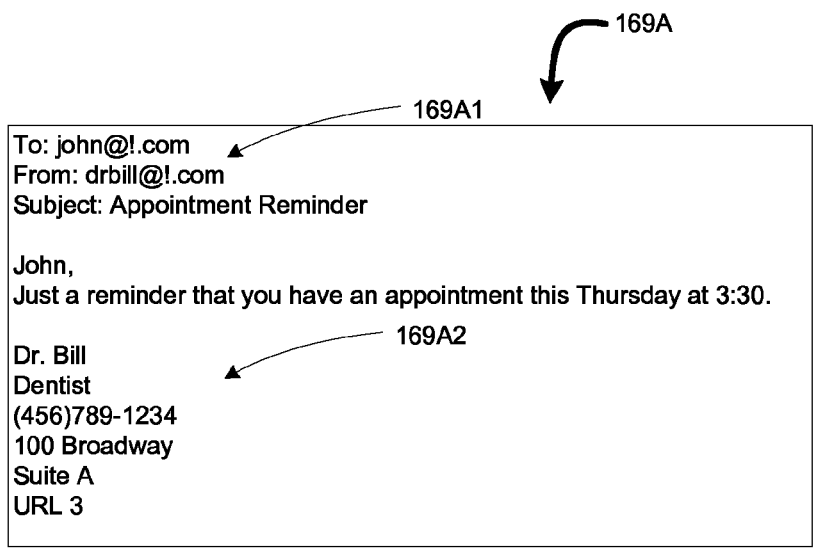
FIG. 5 illustrates an example of a received message of a user that may be utilized to determine information for populating a contact entry of the user.

FIG. 5 illustrates an example of a received message 169A of a user that may be utilized to determine information for populating the contact entry 107C of FIG. 2A. Message 169A is an example of an email message that may be included in user documents database 169. Message 169A may be, for example, a received but unviewed message of a user and/or a received and viewed message of a user. In some implementations, contact information system 120 may populate information from a message in a contact entry only after the user has viewed the message (e.g., as indicated by user interactions 108 and/or user interactions database 168).

The contact information system 120 may identify a phone number ((456)789-1234) associated with the sender of the message 169A to enable determination of one or more contact entries associated with the sender of the message. For example, the text processing engine 122 may process text segment 169A2 and/or other textual segments to determine the text segment 169A2 includes a phone number associated with the sender of the message. For example, the text processing engine 122 may include a rule that contact information included in a signature block at the end of a message may be associated with the sender of the message and that the contact information may be extracted and utilized to determine a contact entry associated with the message. For example, the text processing engine 122 may include a rule to identify one or more types of contact information in a segment of text at the end of a message such as phone numbers, email addresses, URL(s), and/or addresses and to determine such contact information is associated with the sender of the message. For example, the text processing engine 122 may identify the phone number (456)789-1234 in text segment 169A2 and determine the phone number is associated with the sender of the message. The contact information system 120 may match the phone number (456)789-1234 to the associated information for the phone(s) property of contact entry 107C. Based on the matching, the contact information system 120 may determine the message 169A is associated with the contact entry 107C.

The contact information system 120 may further identify additional contact information of the message 169A and populate the contact entry 107C with the additional contact information as illustrated in FIG. 2B. For example, the contact information system 120 may identify the email address "drbill@!.com" of the sender based on structured information associated with the message 169A (e.g., based on structured metadata of the message 169A). Also, for example, the text processing engine 122 may process text segment 169A1 and/or other textual segments to determine the text segment 169A1 includes an email address from which the message was sent. For example, text processing engine 122 may include a rule to extract one or more email addresses that follow "From:" in a message and determine such email addresses indicate the sender of the message. The contact information system 120 may utilize the email address as information for the email property of the contact entry 107C. Also, for example, as described above, the text processing engine 122 may include a rule to identify one or more types of contact information in a segment of text at the end of a message such as text segment 169A2. The contact information system 120 may populate the contact entry 107C with such contact information. For example, the contact information system 120 may populate the contact entry 107C with the aliases "Dr. Bill" and "Dentist", with the address "100 Broadway, Suite A" and, optionally, information related to URL 3 (a hyperlink) included in the text segment 169A2.

Contact information system 120 may utilize various techniques to determine which properties of contact entry 107C should be populated with which contact information identified from message 169A. For example, as described herein, the text processing engine 122 may employ rules and/or classifier based techniques and such techniques may identify contact information and identify particular properties of the contact information (e.g., which aspects of the contact information is an alias, address, email address, phone number, etc.). For example, a rule may define that contact information including an "@" character preceded and followed by text is an email address. Also, for example, as described herein, the text processing engine 122 may include, or may be in communication with, an annotator configured to identify and annotate various types of grammatical information in one or more segments of a document. For example, the annotator may include: a part of speech tagger; a dependency parser; an entity tagger; and/or a coreference resolver. In some implementations, annotations of such an annotator may be utilized to identify particular properties of the contact information. In some implementations, the contact information system 120 may determine an affinity measure associated with the message 169A and populate the contact entry 107C with contact information from the message 169A based on the affinity measure. For example, in some implementations the alias may only be populated in the contact entry 107C when the affinity measure satisfies a threshold.

Figure 6:
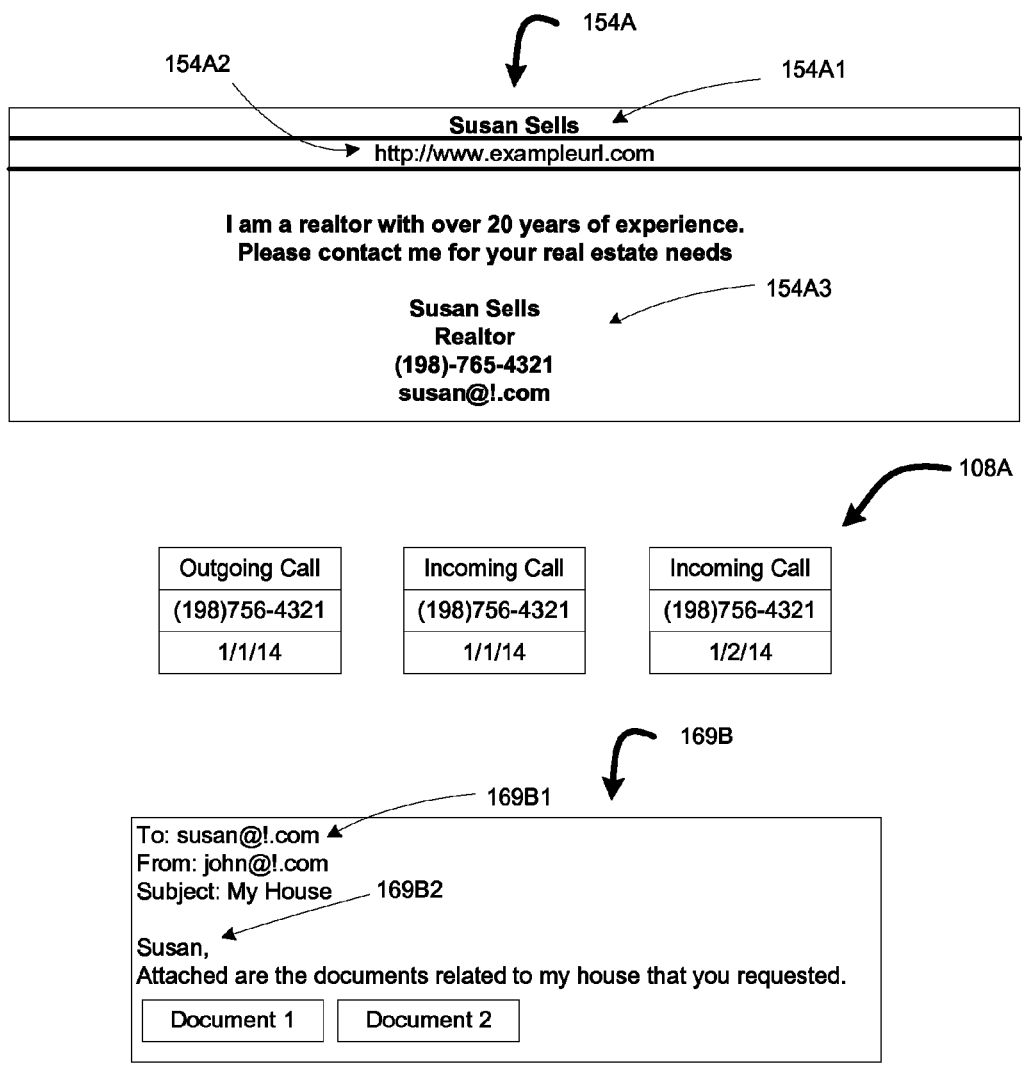
FIG. 6 illustrates examples of a plurality of interactions of a user with an entity that may be utilized to determine an affinity measure associated with the entity and/or to determine information for populating a contact entry of the user for the entity.

FIG. 6 illustrates examples of a plurality of interactions of a user with an entity that may be utilized to determine an affinity measure associated with the entity and/or to determine information for populating a contact entry of the user for the entity. FIG. 6 includes a webpage 154A of public documents database 154, a plurality of calls 108A of user interactions 108, and an email 169B of user documents database 169.

The webpage 154A is a webpage that was interacted with by the user. For example, the webpage 154A may be indicated as interacted with by the user based on an indication in user interactions database 168. For example, the user interactions database 168 may indicate the webpage 154A was selected by the user in response to a search query of the user and/or otherwise navigated to by the user. The webpage 154A includes potential contact information in the title 154A1, the URL 154A2, and the segment of text 154A3 in the body of the webpage. The calls 108A include an outgoing call and two incoming calls from the phone number (198)765-4321 and are each associated with a date of the call. The phone number and/or the dates of the calls are potential contact information. The email 169B is an email sent by the user and includes potential contact information in the "To:" field and in the introductory clause 169B2 in the body of the email 169B.

The contact information system 120 may determine the webpage 154A, the calls 108A, and the email 169B are all associated with interactions with the same entity. For example, the contact information system 120 may determine the webpage 154A and the calls 108A are associated with the same entity based on the phone number (198)756-4321 being associated with the calls 108A and being associated with potential contact information in the segment of text 154A3 of the webpage 154A. Also, for example, the contact information system 120 may determine email 169B is associated with the same entity as the webpage 154A based on the email address susan@!.com being associated with potential contact information in the email 169B and in the webpage 154A. Also, for example, the contact information system 120 may determine email 169B is associated with the same entity as the calls 108A based on the determined associations between the email 169B and the webpage 154A and between the webpage 154A and the calls 108A. Also, for example, in some implementations a separate component and/or database may map one or more of the webpage 154A, the calls 108A, and the email 169B to one or more entities and those items may be determined to be associated with interactions with the same entity based at least in part on such one or more mappings. For example, for each of a plurality of documents, a mapping (e.g., data defining an association) between the document and one or more entities associated with the document may be identified in the entity database 152.

The contact information system 120 may determine an affinity measure associated with the entity based on one or more of the interactions indicated in FIG. 6. In some implementations, the affinity measure may be based at least in part on the quantity of interactions with the entity. For example, an affinity measure may be determined based on all of the interactions indicated in FIG. 6 that is more indicative of interest of the user in the entity, than an affinity measure based on just one of the interactions indicated in FIG. 6. Also, for example, an affinity measure may be determined based on three indicated visits to the webpage 154A that is more indicative of interest of the user in the entity, than an affinity measure based on just one indicated visit to the webpage 154A. In some implementations, determining an affinity measure based on a quantity of interactions may include determining the measure based on a frequency of the interactions. For example, the frequency of the interactions over a time period, as compared to other interactions (e.g., all interactions of the user with entities), and/or as compared to another value may be utilized.

In some implementations, the affinity measure may be based at least in part on the type of interactions with the entity. For example, in some implementations a message sent to an entity may be more indicative of user interest than a message received from the entity. Also, for example, in some implementations a call to an entity may be more indicative of user interest than a visit to a webpage associated with the entity. Also, for example, in some implementations an exchange of multiple messages with the entity may be more indicative of user interest than a single message sent to or received from the entity.

In some implementations, the affinity measure may be based at least in part on one or more characteristics of the interactions with the entity. For example, in some implementations more recent interactions may be more indicative of user interest than less recent interactions. Also, for example, in some implementations a duration associated with the interactions may be taken into account. For example, viewing of an email by the user for 30 seconds may be more indicative of user interest than viewing of the email for 5 seconds. Also, for example, a 10 minute call may be more indicative of user interest than a 30 second call. Also, for example, a webpage that only includes contact information associated with a single entity may be more indicative of user interest than a webpage that includes contact information associated with multiple entities.

Contact information system 120 may populate a contact entry with one or more aspects of contact information associated with an entity based on the affinity measure. For example, the contact information system 120 may create contact entry 107D of FIG. 2B and populate the contact entry 107D with contact information identified from the webpage 154A, calls 108A, and/or email 169B (e.g., utilizing techniques described herein). Also, for example, the contact information system 120 may additionally and/or alternatively identify contact information for the entity from another source (e.g., entity database 152) and populate the contact entry 107D with contact information from the other source (e.g., utilizing techniques described herein).

In some implementations, the contact information system 120 may automatically populate a contact entry with one or more aspects of contact information associated with an entity when the affinity measure satisfies a threshold. In some implementations, the contact information system 120 may query a user prior to populating a contact entry with one or more aspects of contact information. For example, if the affinity measure satisfies a first threshold the contact information system 120 may automatically populate a contact entry with one or more aspects of contact information associated with an entity. However, if the affinity measure fails to satisfy the first threshold, but satisfies a second threshold (less indicative of user interest than the first), then the contact information system 120 may query a user prior to populating a contact entry with one or more aspects of contact information. Multiple sources of indicated interactions with an entity are illustrated in FIG. 6 and described with respect to determining an affinity measure. However, as described herein, in some implementations the affinity measure may be based on a single source such as a single document.

Figure 7:
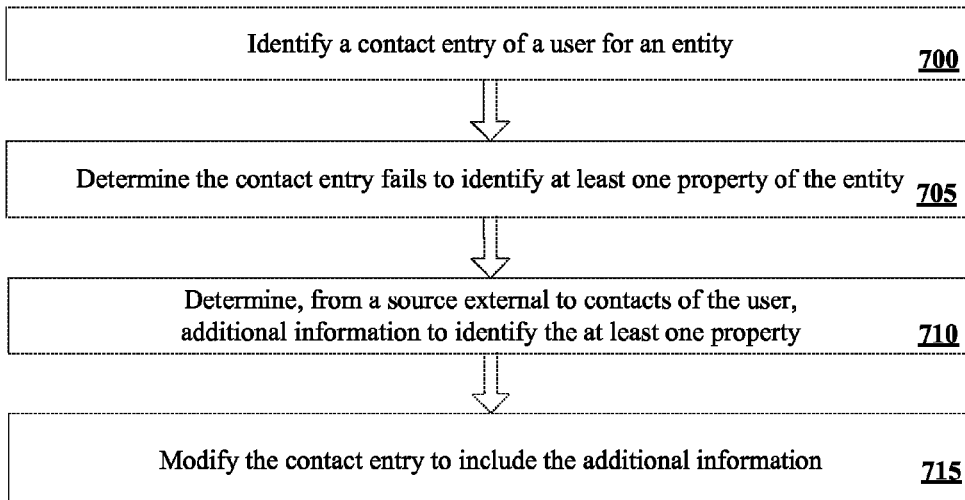
FIG. 7 is a flow chart illustrating an example method of modifying a contact entry of a user to include additional information determined from a source external to contacts of the user.

FIG. 7 is a flow chart illustrating an example method of modifying a contact entry of a user to include additional information determined from a source external to contacts of the user. Other implementations may perform the steps in a different order, omit certain steps, and/or perform different and/or additional steps than those illustrated in FIG. 7. For convenience, aspects of FIG. 7 will be described with reference to a system of one or more computers that perform the process. The system may include, for example, the contact information system 120 of FIG. 1.

At step 700, a contact entry of a user for an entity is identified. For example, the contact information system 120 may identify the contact entry in one or more contact collections associated with the user such as a contact collection of contacts 107 and/or user contacts database 167. As one example, the contact entry 107A of FIG. 2A may be identified.

At step 705, it is determined the contact entry identified at step 700 fails to identify at least one property of the entity. For example, the contact information system 120 may identify the contact entry fails to include information for one or more of the properties of the contact entry and/or fails to include multiple pieces of information for one or more of the properties of the contact entry that are capable of including multiple pieces of information. As one example, the contact information system 120 may identify the contact entry 107A fails to identify multiple aliases.

At step 710, additional information to identify the at least one property is determined from a source external to the contacts of the user. For example, the contact information system 120 may determine a source that includes additional information for the entity based on determining an association between at least some of the associated information of the contact entry for the entity and information in the source. The contact information system 120 may then identify the at least one property from the source. As one example, the contact information system 120 may identify the message 109A of FIG. 3 is sent to "Robert Herman", which matches the associated information for the alias property of contact entry 107A and/or identify the message 109A is sent to the phone number "(123)456-7891", which matches the associated information for the phone(s) property of contact entry 107A. The contact information system 120 may further identify the alias "Bobby" as an alias for the contact entry 107A utilizing one or more techniques, such as techniques described above with respect to FIG. 3. For example, the contact information system 120 may identify "Bobby" as an alias based on determining the message 109A is sent to only a single entity and based on the text processing engine 122 identifying "Bobby" as a term utilized in an introductory clause of the message 109A. Additional and/or alternative source(s) may be utilized to identify the at least one property and/or additional properties, such as entity database 152 and/or a yellow pages or white pages listing of contact information for entities (e.g., a listing in public documents database 154).

At step 715, the contact entry of step 700 is modified to include the additional information. For example, the contact information system 120 may automatically populate the contact entry with the additional information. As one example, as illustrated in FIG. 2B the contact information system 120 may populate the contact entry 107A with "Bobby" as an additional alias.

In some implementations, the steps of FIG. 7 may be performed on a periodic or other basis to update contact information of a user. Also, in some implementations, the steps of FIG. 7 and/or similar steps may be performed in a different order. For example, in some implementations, the steps of FIG. 7 may be performed to process one or more documents associated with a user and determine if those documents include any contact information to update and/or create one or more contact entries of the user. For example, in some implementations: contact information for an entity may be determined from a source external to contacts of the user; a contact entry of a user for the entity may be identified; it may be determined that the contact entry fails to identify at least one property of the entity that is included in the contact information of the source; and the contact entry may be modified to include the contact information of the source that identifies the at least one property.

Figure 8:
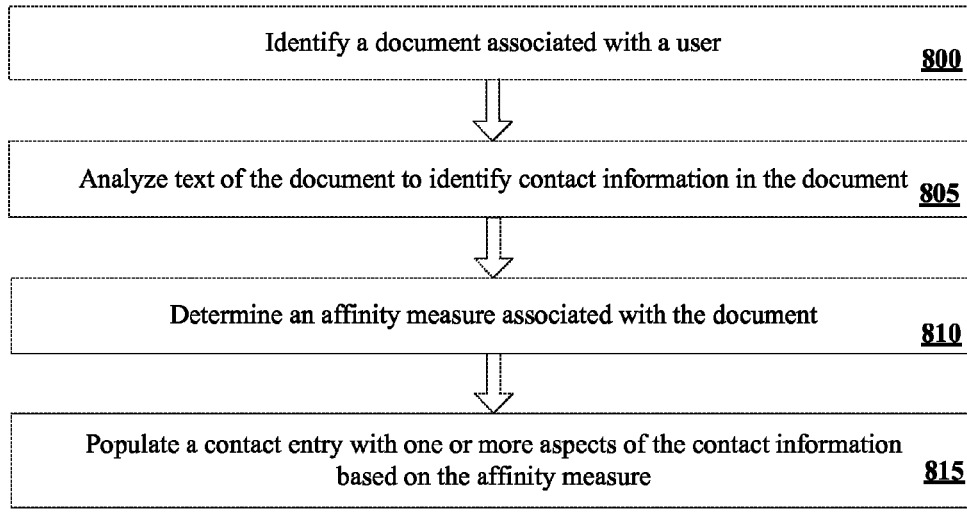
FIG. 8 is a flow chart illustrating an example method of determining an affinity measure for a document associated with a user and populating, based on the affinity measure, a contact entry of the user with contact information identified from the document.

FIG. 8 is a flow chart illustrating an example method of determining an affinity measure for a document associated with a user and populating, based on the affinity measure, a contact entry of the user with contact information identified from the document. Other implementations may perform the steps in a different order, omit certain steps, and/or perform different and/or additional steps than those illustrated in FIG. 8. For convenience, aspects of FIG. 8 will be described with reference to a system of one or more computers that perform the process. The system may include, for example, the contact information system 120 of FIG. 1.

At step 800, a document associated with a user is identified. For example, the contact information system 120 may identify the document from user documents 109, user documents database 169, and/or public documents database 154. In some implementations, the document may be one of: a document visited by the user and a message sent or received by the user. As one example, webpage 154A may be identified based on being indicated as interacted with by the user in user interactions database 168 and/or user interactions 108. For example, the user interactions database 168 may indicate the webpage 154A was selected by the user in response to a search query of the user and/or otherwise navigated to by the user.

At step 805, text of the document is analyzed to identify contact information in the document. For example, the text processing engine 122 of contact information system 120 may process text of the document to determine if the text includes contact information and/or to determine particular properties of the contact information. In some implementations, the text processing engine 122 may receive as input one or more signals associated with one or more segments of text and utilize classifier and/or rules based approaches to determine contact information and/or to determine particular properties of the contact information.

At step 810, an affinity measure associated with the document is determined. The affinity measure is indicative of an amount of interest of the user in the document. In some implementations, the affinity measure may be determined based on interaction(s) of the user related to the document such as quantity of interactions of the user with the document, quantity of interactions of the user with an entity associated with the document, and/or a length of interaction(s) with the document and/or an entity associated with the document. As one example, the affinity measure associated with the webpage 154A may be based on a quantity of visits to the webpage 154A by the user and/or a length of one or more visits by the user to the webpage 154A. In some implementations, the affinity measure associated with the webpage 154A may additionally and/or alternatively be based on a quantity of interactions of the user with an entity associated with the document, and/or a length of interaction(s) with the entity associated with the document. For example, as described with respect to FIG. 6, additional interactions of the user with an entity associated with the webpage 154A may be identified and the affinity measure based at least in part on such additional interactions. In some implementations, and as described with respect to FIGS. 9-11, the text of the document may be analyzed to determine a contact information change measure in the document and the affinity measure may be based at least in part on the contact information change measure.

At step 815, the contact entry is populated with one or more aspects of the contact information based on the affinity measure. In some implementations, the contact information system 120 may automatically populate a contact entry with one or more aspects of the contact information when the affinity measure satisfies a threshold. In some implementations, the contact information system 120 may query a user prior to populating a contact entry with one or more aspects of contact information. For example, if the affinity measure satisfies a first threshold the contact information system 120 may automatically populate a contact entry with one or more aspects of contact information associated with an entity. However, if the affinity measure fails to satisfy the first threshold, but satisfies a second threshold (less indicative of user interest than the first), then the contact information system 120 may query a user prior to populating a contact entry with one or more aspects of contact information. In some implementations, additional source(s) may be utilized to identify additional contact information for the contact entry, such as entity database 152 and/or a yellow pages or white pages listing of contact information for entities (e.g., a listing in public documents database 154).

The steps of FIG. 8 may be performed on a periodic or other basis to update contact information of a user. For example, the steps of FIG. 8 may be performed when new documents associated with the user are identified, such as when the user receives new messages, views new messages, visits webpages, etc.

Figure 9:
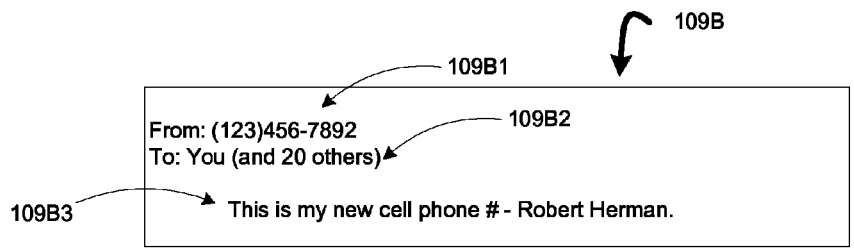
FIG. 9 illustrates an example of a received message of a user that includes a contact information change indication and that may be utilized to determine information for populating a contact entry of the user.

FIG. 9 illustrates an example of a received message 109B of a user that includes a contact information change indication and that may be utilized to determine information for populating a contact entry of the user. Message 109B is an example of a text message that may be included in user documents 109. In some implementations, one or more aspects of message 109B may be provided by client device 106, directly or indirectly, to the contact information system 120.

The contact information system 120 may determine a contact information change measure of the message 109B and populate a contact entry of the user with one or more aspects of contact information identified in the document based on the contact information change measure. The contact information change measure of a document is indicative of a likelihood that the document includes a contact information change indication that suggests contact information for an entity has been changed. The contact information change measure may be based on one or more signals associated with the document such as those described herein (e.g., contact information change terms, position of contact change terms and/or contact information, quantity of recipients). In some implementations, a contact information change measure may be expressed as a numeric or alphabetical value along a range, e.g., from zero to one. In some implementations, a contact information change measure may be expressed in binary fashion, e.g., as positive (e.g., "true") or negative (e.g., "false").

In some implementations, the contact information system 120 determines an affinity measure associated with the message 109B based, in whole or in part, on the contact information change measure. In some versions of those implementations, populating a contact entry of the user with one or more aspects of contact information based on the contact information change measure may include one or more aspects of populating the contact entry based on the affinity measure as described herein. In some implementations, populating a contact entry based on the contact information change measure includes only populating a contact entry with information that contradicts existing associated information of the contact entry when the contact information change measure associated with the contradictory contact information satisfies a threshold indicative of a recent change to the contact information. For example, in some implementations the contact information system 120 may automatically supplant associated contact information with contradictory contact information in a contact entry if the contact information change measure satisfies a first threshold. Also, for example, in some implementations the contact information system 120 may include both the already associated contact information and the contradictory contact information in a contact entry if the contact information change measure satisfies a second threshold (less indicative of recent change than the first threshold) but fails to satisfy the first threshold. Also, for example, the contact information system 120 may not include the contradictory contact information in the contact entry if the contact information measure fails to satisfy the second threshold.

In some implementations, the contact information system 120 may determine the contact information change measure based on one or more signals associated with the message 109B. For example, the contact information system 120 may determine the contact information change measure based on the presence and/or absence of one or more determined and/or defined contact information change terms such as "new", "update", "changed", etc. For example, presence of one or more contact information change terms may be more indicative of a contact information change indication than lack of any contact information change terms. Also, for example, the contact information system 120 may determine the contact information change measure based on the proximity of one or more contact information change terms to identified contact information in the document. For example, when contact information immediately precedes or follows a phrase including a contact information change term, it may be more indicative of a contact information change indication than when multiple phrases intercede. Also, for example, the contact information system 120 may determine the contact information change measure based on the position of the contact information in the document. For example, when contact information is toward the beginning of the document, it may be more indicative of a contact information change indication than when the contact information is at the end of the document with a large segment of text preceding the contact information. Also, for example, the contact information system 120 may determine the contact information change measure based on the quantity of recipients (if any) of the document. For example, if the document is a message and twenty recipients were sent the message, it may be more indicative of a contact information change indication than when only one recipient was sent the message.

In some implementations, the text processing engine 122 may include one or more rules for determining a contact information change measure, such as one or more rules that take into account one or more of the aforementioned signals. In some implementations, the text processing engine 122 may additionally and/or alternatively utilize a classifier trained to identify whether a contact information change is present in a document. In some versions of those implementations, the classifier may be trained, for example, utilizing one or more supervised or semi-supervised training techniques based on documents that have each been labeled as including and/or not including a contact information change indication.

In some implementations, the contact information system 120 may determine a contact information change measure of the message 109B that is indicative of a contact information change indication based at least in part on the message 109B being sent to twenty-one people as indicated by 109B2 and based on the text segment 109B3 including the contact information change term "new". The contact information system 120 may further identify the message 109B is associated with the contact entry 107A of FIGS. 2A and 2B based on inclusion of the alias "Robert Herman" in the text segment 109B3 and identifying the alias matches an alias of the contact entry 107A. The contact information system 120 may further identify a phone number from which the message was sent ((123-456-7892)) based on structured information associated with the message 109B and/or processing of text segment 109B1 by the processing engine 122. The determined phone number may be compared to the associated phone number in contact entry 107A to determine the phone numbers do not match. Based on the phone numbers not matching, and based on the contact information change measure, the contact information system 120 may populate the contact entry 107A with the determined phone number. In some implementations, the contact information system 120 may automatically supplant the existing phone number of entry 107A with the determined phone number. In some other implementations, the contact information system 120 may query the user prior to supplanting the existing phone number and/or store both the existing phone number and the determined phone number (optionally with an indication the determined phone number is likely a new phone number based on message 109B).

Figure 10:
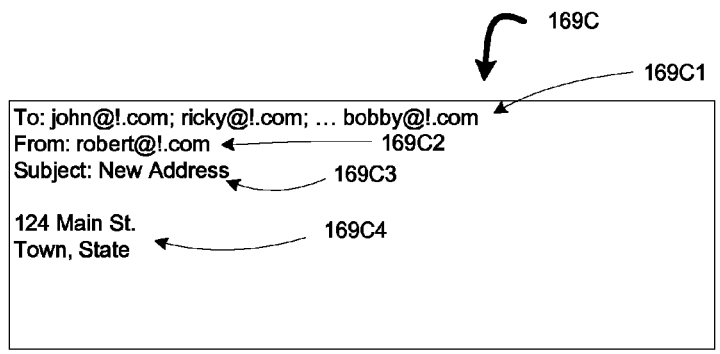
FIG. 10 illustrates another example of a received message of a user that includes a contact information change indication and that may be utilized to determine information for populating a contact entry of the user

FIG. 10 illustrates another example of a received message 169C of a user that includes a contact information change indication and that may be utilized to determine information for populating a contact entry of the user. Message 169C is an example of an email of the user that may be included in user documents database 169. The contact information system 120 may determine a contact information change measure of the message 169C and populate a contact entry of the user with one or more aspects of contact information identified in the document based on the contact information change measure.

In some implementations, the contact information system 120 may determine a contact information change measure of the message 169C that is indicative of a recent change in contact information based at least in part on the message 169C being sent to multiple email addresses as indicated by 169C1, based on the subject text segment 169C3 including the contact information change terms "new address", and/or based on the contact information in text segment 169C4 appearing at the beginning of the body of the message 169C. The contact information system 120 may further identify the message 169C is associated with the contact entry 107A of FIGS. 2A and 2B based on the email being sent from "robert@!.com" as indicated by 169C2 and identifying the email matches an email of the contact entry 107A. The contact information system 120 may further identify an address (124 Main St. Town, State) based on processing of text segment 169C4 by the text processing engine 122. The determined address may be compared to the associated address in contact entry 107A to determine the addresses do not match. Based on the addresses not matching, and based on the contact information change measure, the contact information system 120 may populate the contact entry 107A with the determined address. In some implementations, the contact information system 120 may automatically supplant the existing address of entry 107A with the determined address. In some other implementations, the contact information system 120 may query the user prior to supplanting the existing address and/or store both the existing address and the determined address (optionally with an indication the determined address is likely a new address).

Figure 11:
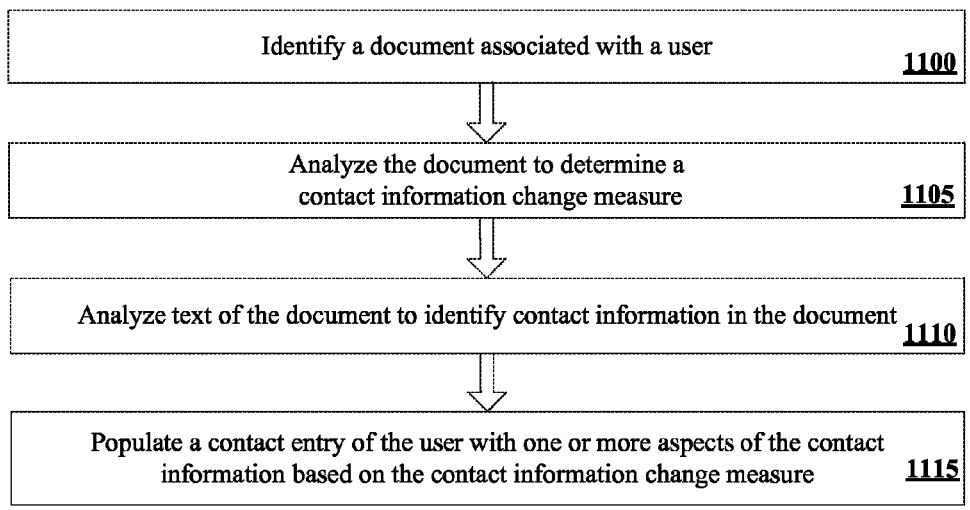
FIG. 11 is a flow chart illustrating an example method of determining a contact information change indication in a document associated with a user and populating, based on the contact information change indication, a contact entry of the user with contact information identified from the document.

FIG. 11 is a flow chart illustrating an example method of determining a contact information change indication in a document associated with a user and populating, based on the contact information change indication, a contact entry of the user with contact information identified from the document. Other implementations may perform the steps in a different order, omit certain steps, and/or perform different and/or additional steps than those illustrated in FIG. 11. For convenience, aspects of FIG. 11 will be described with reference to a system of one or more computers that perform the process. The system may include, for example, the contact information system 120 of FIG. 1.

At step 1100, a document associated with a user is identified. For example, the contact information system 120 may identify the document from user documents 109, user documents database 169, and/or public documents database 154. In some implementations, the document may be one of: a document visited by the user and a message sent or received by the user. As one example, message 109B may be identified based on being included in user documents 109.

At step 1105, the document is analyzed to determine a contact information change measure. The contact information change measure of a document is indicative of a likelihood that the document includes a contact information change indication that suggests contact information for an entity has been changed. In some implementations, the contact information system 120 may determine the contact information change measure based on one or more signals associated with the document. As one example, the contact information system 120 may determine a contact information change measure of the message 109B that is indicative of a contact information change indication based at least in part on the message 109B being sent to twenty-one people as indicated by 109B2 and based on the text segment 109B3 including the contact information change term "new". In some implementations, the text processing engine 122 may receive as input one or more signals associated with the document and utilize classifier and/or rules based approaches to determine the contact information change measure.

At step 1110, text of the document is analyzed to identify contact information in the document. For example, the text processing engine 122 of contact information system 120 may process text of the document to determine if the text includes contact information and/or to determine particular properties of the contact information. In some implementations, the text processing engine 122 may receive as input one or more signals associated with one or more segments of text and utilize classifier and/or rules based approaches to determine contact information and/or to determine particular properties of the contact information.

At step 1115, a contact entry of the user is populated with one or more aspects of the contact information based on the contact information change measure. For example, the contact information system 120 may identify a contact entry of the user that is associated with the document identified at step 1100 and populate the contact entry with one or more aspects of the contact information based on the contact information change measure satisfying a threshold. As one example, the contact information system 120 may identify the message 109B is associated with the contact entry 107A of FIGS. 2A and 2B based on inclusion of the alias "Robert Herman" in the text segment 109B3 and identifying the alias matches an alias of the contact entry 107A. The contact information system 120 may further identify a phone number from which the message was sent ((123-456-7892)) based on structured information associated with the message 109B and/or processing of text segment 109B1 by the processing engine 122. The determined phone number may be compared to the associated phone number in contact entry 107A to determine the phone numbers do not match. Based on the phone numbers not matching, and based on the contact information change measure, the contact information system 120 may populate the contact entry 107A with the determined phone number. In some implementations, the contact information system 120 may automatically supplant the existing phone number of entry 107A with the determined phone number. In some other implementations, the contact information system 120 may query the user prior to supplanting the existing phone number and/or store both the existing phone number and the determined phone number (optionally with an indication the determined phone number is likely a new phone number based on message 109B).

The steps of FIG. 11 may be performed on a periodic or other basis to update contact information of a user. For example, the steps of FIG. 11 may be performed when new documents of a user, such as messages, are received.

FIG. 12 is an example of a user interface for displaying information from a contact entry. The user interface includes a search field representation 1204 and a search button representation to the right of the search field representation 1204. In this example, the user has entered the query "Bobby" into the search field representation 1204 and a display 1280 based on the contact entry 107A of FIG. 2B is displayed. In some implementations, the client device 106 and/or the contact information system 120 may determine the contact entry 107A is responsive to the query "Bobby" based on, for example, matching of the term "Bobby" to an alias property of the contact entry 107A. The display 1280 includes associated information for the alias(es), phone(s), and email(s) properties of contact entry 107A. The display 1280 also includes an image associated with contact entry 107A (e.g., included in contact entry 107A and/or identified based on additional source(s)). Additional and/or alternative displays may be provided than the example illustrated in FIG. 12. For example, information from additional and/or alternative properties may be provided and/or provided properties may be formatted for presentation in a different manner than that illustrated in display 1280.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

FIG. 13 is a block diagram of an example computer system 1310. Computer system 1310 typically includes at least one processor 1314 which communicates with a number of peripheral devices via bus subsystem 1312. These peripheral devices may include a storage subsystem 1324, including, for example, a memory subsystem 1325 and a file storage subsystem 1327, user interface input devices 1322, user interface output devices 1320, and a network interface subsystem 1316. The input and output devices allow user interaction with computer system 1310. Network interface subsystem 1316 provides an interface to outside networks and is coupled to corresponding interface devices in other computer systems.

User interface input devices 1322 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 1310 or onto a communication network.

User interface output devices 1320 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 1310 to the user or to another machine or computer system.

Storage subsystem 1324 stores programming and data constructs that provide the functionality of some or all of the modules described herein. For example, the storage subsystem 1324 may include the logic to perform one or more of the methods described herein such as, for example, the methods of FIGS. 7, 8, and/or 11.

These software modules are generally executed by processor 1314 alone or in combination with other processors. Memory 1325 used in the storage subsystem can include a number of memories including a main random access memory (RAM) 1330 for storage of instructions and data during program execution and a read only memory (ROM) 1332 in which fixed instructions are stored. A file storage subsystem 1327 can provide persistent storage for program and data files, and may include a hard disk drive, a floppy disk drive along with associated removable media, a CD-ROM drive, an optical drive, or removable media cartridges. The modules implementing the functionality of certain implementations may be stored by storage subsystem 1324 in the file storage subsystem 1327, or in other machines accessible by the processor(s) 1314.

Bus subsystem 1312 provides a mechanism for letting the various components and subsystems of computer system 1310 communicate with each other as intended. Although bus subsystem 1312 is shown schematically as a single bus, alternative implementations of the bus subsystem may use multiple busses.

Computer system 1310 can be of varying types including a workstation, server, computing cluster, blade server, server farm, or any other data processing system or computing device. Due to the ever-changing nature of computers and networks, the description of computer system 1310 depicted in FIG. 13 is intended only as a specific example for purposes of illustrating some implementations. Many other configurations of computer system 1310 are possible having more or fewer components than the computer system depicted in FIG. 13.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer-implemented method, comprising:
    identifying, by a system of one or more computers, a document associated with a user, the document visited, sent, or received by the user;
    analyzing text of the document by the system according to one or more regular expressions to identify contact information in the document, the contact information including one or more of an alias, a phone number, an email address, an occupation, a uniform resource locator, and an address;
    determining, by the system, an affinity measure associated with the document, the affinity measure indicative of an interest of the user in the document; and
    populating, by the system and based on the affinity measure satisfying a threshold, a contact entry of a database of contact entries of the user with one or more aspects of the contact information, the populating including associating one or more properties of the contact entry with corresponding of the aspects of the contact information in the database;
    receiving a query entered by the user at a client computing device;
    determining the contact entry is responsive to the query based on matching the query to at least one of the populated aspects of the contact entry; and
    providing information from the contact entry for display at the client computing device in response to the query.

2. The computer-implemented method of claim 1, wherein the document is received by the user from an entity, and further comprising:
    identifying a measure indicative of a quantity of interactions of the user with the entity;
    wherein determining the affinity measure for the document is based on the measure indicative of the quantity of interactions.

3. The computer-implemented method of claim 1, further comprising:
    analyzing the document to identify a contact information change measure associated with the document, the contact information change measure indicative of likelihood of a recent change to the contact information;
    wherein determining the affinity measure for the document is based on the contact information change measure.

4. The computer-implemented method of claim 3, wherein populating the contact entry of the user with the one or more aspects of the contact information includes supplanting existing information of the contact entry with the one or more aspects of the contact information.

5. The computer-implemented method of claim 3, wherein analyzing the document to identify the contact information change measure includes:
    determining the contact information change measure based at least in part on presence of one or more contact information change terms in the text of the document.

6. The computer-implemented method of claim 5, wherein the document is received by the user from an entity and further comprising:
    identifying a quantity of recipients of the document;
    wherein determining the contact information change measure is based at least in part on the quantity of recipients of the document.

7. The computer-implemented method of claim 5, wherein determining the contact information change measure is based at least in part on proximity of the one or more contact information change terms to the contact information in the document.

8. The computer-implemented method of claim 5, wherein determining the contact information change measure is based at least in part on a position of the contact information in the document.

9. The computer-implemented method of claim 1, wherein the document is sent by the user to an entity, and wherein analyzing the text of the document to identify the contact information in the document includes:
    analyzing the text to identify an introductory clause of the document;
    identifying an alias of the contact information based on one or more terms of the introductory clause; and
    using the alias as at least some of the one or more aspects of the contact information.

10. The computer-implemented method of claim 1, wherein populating the contact entry of the user with the one or more aspects of the contact information includes:
    identifying the contact entry from a plurality of existing contact entries associated with the user; and
    supplementing or supplanting information of the contact entry with the one or more aspects of the contact information.

11. The computer-implemented method of claim 10, wherein identifying the contact entry from the plurality of existing contact entries associated with the user includes:
    identifying an association between one or more aspects of the contact information and at least some preexisting information of the contact entry.

12. The computer-implemented method of claim 1, wherein populating the contact entry of the user with one or more aspects of the contact information includes:
    identifying a lack of association between the contact information and existing contact entries associated with the user; and
    creating the contact entry based on the identified lack of association.

13. The system of claim 12, wherein the document is sent by the user to an entity, and wherein the instructions to analyze the text of the document to identify the contact information in the document include instructions to:
    analyze the text to identify an introductory clause of the document;
    identify an alias of the contact information based on one or more terms of the introductory clause; and
    use the alias as at least some of the one or more aspects of the contact information.

14. The system of claim 12, wherein the instructions to populate the contact entry of the user with one or more aspects of the contact information include instructions to:
- identify the contact entry from a plurality of existing contact entries associated with the user; and
- supplement or supplant information of the contact entry with the one or more aspects of the contact information.

15. The system of claim 14, wherein the instructions to identify the contact entry from the plurality of existing contact entries associated with the user include instructions to:
- identify an association between one or more aspects of the contact information and at least some preexisting information of the contact entry.

16. The system of claim 1, wherein the instructions to populate the contact entry of the user with one or more aspects of the contact information include instructions to:
- identify a lack of association between the contact information and existing contact entries associated with the user; and
- create the contact entry based on the identified lack of association.

17. A system comprising:
- a database of contact entries of a user;
- memory and one or more processors operable to execute instructions stored in the memory, comprising instructions to:
- identify a document associated with a user, the document visited, sent, or received by the user;
- analyze text of the document according to one or more regular expressions to identify contact information in the document, the contact information including one or more of an alias, a phone number, an email address, an occupation, a uniform resource locator, and an address;
- determine an affinity measure associated with the document, the affinity measure indicative of an interest of the user in the document; and
- populate, based on the affinity measure satisfying a threshold, a contact entry of the database of contact entries of the user with one or more aspects of the contact information, the populating including associating one or more properties of the contact entry with corresponding of the aspects of the contact information in the database of contact entries;
- receive a query entered by the user at a client computing device;
- determine the contact entry is responsive to the query based on matching the query to at least one of the populated aspects of the contact entry; and
- provide information from the contact entry for display at the client computing device in response to the query.

18. The system of claim 17, wherein the document is received by the user from an entity, and wherein the instructions further include instructions to:
- identify a measure indicative of a quantity of interactions of the user with the entity;
- wherein the instructions to determine the affinity measure for the document include instructions to determine the affinity measure based on the measure indicative of the quantity of interactions.

19. The system of claim 17, wherein the instructions further include instructions to:
- analyze the document to identify a contact information change measure associated with the document, the contact information change measure indicative of likelihood of a recent change to the contact information;
- wherein the instructions to determine the affinity measure for the document include instructions to determine the affinity measure based on the contact information change measure.

20. The system of claim 19, wherein the instructions to populate the contact entry of the user with the one or more aspects of the contact information include instructions to supplant existing information of the contact entry with the one or more aspects of the contact information.

21. The system of claim 19, wherein the instructions to analyze the document to identify the contact information change measure include instructions to:
- determine the contact information change measure based at least in part on presence of one or more contact information change terms in the text of the document.

22. The system of claim 21, wherein the document is received by the user from an entity and wherein the instructions further include instructions to:
- identify a quantity of recipients of the document;
- wherein the instructions to determine the contact information change measure include instructions to determine the contact information change measure based at least in part on the quantity of recipients of the document.

23. The system of claim 21, wherein the instructions to determine the contact information change measure include instructions to determine the contact information change measure based at least in part on proximity of the one or more contact information change terms to the contact information in the document.

24. The system of claim 21, wherein the instructions to determine the contact information change measure include instructions to determine the contact information change measure based at least in part on a position of the contact information in the document.

25. A non-transitory computer readable storage medium storing computer instructions executable by a system of one or more computers, to perform a method comprising:
- identifying, by the system of one or more computers, a document associated with a user, the document visited, sent, or received by the user;
- analyzing text of the document by the system according to one or more regular expressions to identify contact information in the document, the contact information including one or more of an alias, a phone number, an email address, an occupation, a uniform resource locator, and an address;
- determining, by the system, an affinity measure associated with the document, the affinity measure indicative of an interest of the user in the document; and
- populating, by the system and based on the affinity measure satisfying a threshold, a contact entry of a database of contact entries of the user with one or more aspects of the contact information, the populating including associating one or more properties of the contact entry with corresponding of the aspects of the contact information in the database;
- receiving a query entered by the user at a client computing device;
- determining the contact entry is responsive to the query based on matching the query to at least one of the populated aspects of the contact information; and
- providing information from the contact entry for display at the client computing device in response to the query.

* * * * *